United States Patent [19]
Feldman et al.

[11] Patent Number: 5,486,082
[45] Date of Patent: Jan. 23, 1996

[54] REMOTELY CONTROLLED EXTENDABLE LIFT APPARATUS FOR A VAN

[76] Inventors: Zeiylik Y. Feldman, 941 No. Sierra Bonita #2, Los Angeles, Calif. 90046; Yakov Z. Feldman, 7311 Kester Ave., #3, Van Nuys, Calif. 91405

[21] Appl. No.: 271,198

[22] Filed: Jul. 7, 1994

[51] Int. Cl.$^6$ ................................................ B60P 1/54
[52] U.S. Cl. .......................... 414/542; 414/540; 212/252
[58] Field of Search ................................ 414/496, 522, 414/540–542, 560, 674; 212/86, 132, 252

[56] References Cited

U.S. PATENT DOCUMENTS

| | | | |
|---|---|---|---|
| 3,006,485 | 10/1961 | Martin | 414/542 |
| 3,656,637 | 4/1972 | Lynn et al. | 414/542 |
| 3,957,164 | 5/1976 | Brown | 414/542 |
| 4,074,891 | 2/1978 | Ritter | 212/86 X |
| 4,187,048 | 2/1980 | Bohlmann . | |
| 4,239,440 | 12/1980 | James . | |
| 4,252,491 | 2/1981 | Hock . | |
| 4,310,098 | 1/1982 | Dirksen . | |
| 4,725,185 | 2/1988 | Neagu | 414/540 |
| 4,806,060 | 2/1989 | Molski | 414/921 X |
| 4,858,855 | 8/1989 | Dalbera | 414/542 X |
| 5,090,580 | 2/1992 | Nelson . | |
| 5,119,961 | 6/1992 | Runn . | |
| 5,338,147 | 8/1994 | Kucharczyk et al. | 414/542 |

FOREIGN PATENT DOCUMENTS

| | | | |
|---|---|---|---|
| 2105294 | 3/1983 | United Kingdom | 414/542 |
| 2274094 | 7/1994 | United Kingdom | 414/542 |
| 2015472 | 9/1992 | WIPO | 414/542 |
| 3022157 | 11/1993 | WIPO | 414/542 |

Primary Examiner—Michael S. Huppert
Assistant Examiner—James W. Keenan
Attorney, Agent, or Firm—Merchant, Gould, Smith, Edell, Welter & Schmidt

[57] ABSTRACT

An extendable lifting apparatus for a vehicle. The apparatus includes a support bracket secured to the floor of the vehicle. A tube is mounted to the support bracket perpendicularly to the axis of the vehicle frame. The tube receives a boom which is used to support a cable used to lift heavy objects. The tube is substantially rectangular and has an axial slot extending along the bottom to form an axial opening that allows the cable to be suspended therein when the boom is in the fully retracted position. The slotted wall of the tube also acts as a floor opposite an inner ceiling. A winch is coupled to the boom for successively winding and unwinding the cable. A motor is coupled to the tube for moving the boom from a retracted position wholly within the tube to an advanced position. A second motor is coupled to the winch for controlling the winding and unwinding of the cable. Control of the two motors is provided by a remote control. Finally, a brake is provided for preventing the unwinding of the winch allowing a suspended object to freefall when the second motor experiences failure.

14 Claims, 4 Drawing Sheets

FIG. I

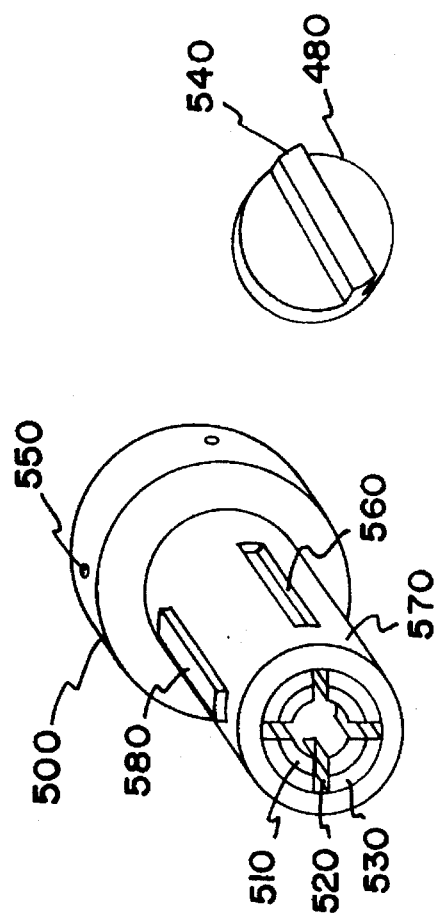
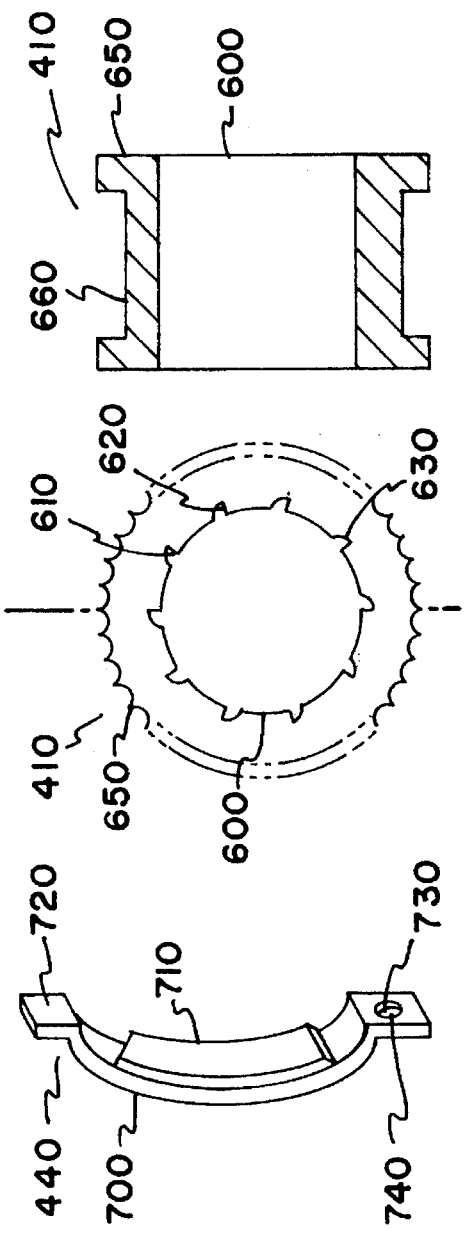

REMOTELY CONTROLLED EXTENDABLE LIFT APPARATUS FOR A VAN

BACKGROUND OF THE INVENTION

1. Field of the Invention

This invention relates to an apparatus for loading and unloading heavy objects to and from a van and more particularly to a device having a boom extendable from the side door of a van (the extension and lifting may be controlled remotely).

2. Description of Related Art

The use of vans for service intensive businesses has proliferated due to their great versatility. Plumbing contractors, appliance repair contractors and other labor intensive type of services have long used vans because of their unique convenience. Unlike the open beds of trucks, vans provide a covered enclosure which can be locked and secured, thereby protecting its contents. Shelving and storage containers may be mounted on the interior walls of the van and access to the interior is usually provided from the rear by adjoining doors which swing outward away from the van and by a sliding panel on the side of such vans, very often, it is desirable to transport heavy machinery, appliances, or other cargo from a remote location back to the main warehouse or shop for further service.

There have been many commercial systems available for open trucks and vans which have hoist systems mounted thereto for facilitating the loading and unloading of the aforementioned heavy cargo. Hoist systems, in general, have been bulky thereby utilizing the great majority of a space within the van. One example of an apparatus for loading and unloading a van which includes a framework within the van is shown in U.S. Pat. No. 4,187,048. The hoist mechanism includes a beam which is slidably mounted within the van. The winch is movably disposed on the beam for allowing an object to be loaded by hoisting an object upwardly when the beam and the hoist extend out the rear of the van. The beam may be slid manually to a position within the van once the object is hoisted. Thereafter it can then be lowered to the floor of the van prior to transporting. In operation, the van is backed up to an object where the rear doors of the van are opened and the I-beam slid outwardly along an axis parallel to the length of the van. Both the winch and the sliding of the I-beam are manually operated. The problem with this type of hoist system is that it does not enable an object to be loaded through the side door of a van, and the operation of the winch and the control of the extension of the boom are manually controlled.

Another example of a hoist system is disclosed in U.S. Pat. No. 4,252,491. U.S. Pat. No. 4,252,491 shows a hoist for loading and unloading cargo through a side doorway of a van. The hoist system consists of a platform which may be lowered outside the vehicle wherein the object to be hoisted is moved onto the platform and the platform thereafter raised by an electric winch connected to the platform by cables. However, the problem with this type of system is that the object to be loaded into the van must be first positioned over the platform. However, it is often desirable to position the van relative to the object to be moved, to position the boom over the object, to lower a cable down to the object, lift the object, and then move the boom back into the interior of the van where the object can then be lowered.

Another exemplary system is U.S. Pat. No. 4,806,060, which is for hoisting a wheelchair for vehicle having a body, a roof, and a door opening. The hoist system comprises a support bar suspended from the roof of the van with a mount tube reciprocally mounted upon the support bar. A boom is mounted to the support tube. A reversible electric motor is supported upon the mount tube and drives a pinion and mesh with a stationary rack gear for reciprocally feeding the boom from its retracted position to an advance position through the door opening. However, this system has the problem that the support for the extendable boom is secured to the roof of the van by spaced hanger brackets. Therefore, the ability to lift heavy objects such as appliances is severely limited. Further the rack gear and motor would not provide sufficient torque to lift heavy appliances.

Accordingly, it can be seen that there is a need for an extendable boom mechanism for loading and unloading heavy cargo from the side door of a van while maximizing lift capability, ease of use, and minimization of the interior area of the van.

SUMMARY OF THE INVENTION

To overcome the limitations of prior art described above, and to overcome other limitations that will become apparent upon reading and understanding the present specification, the present invention discloses a remotely controlled extendable boom for loading and unloading heavy cargo through the side door of a van. The present invention solves the above-described problems by providing a framework for supporting the extendable boom within the van while minimizing the use of the cargo area of the van. Further the extendable boom is remotely controlled and is designed to lift in excess of a thousand pounds. The winch is driven by a separate drive mechanism. The winch drive mechanism provides a sufficient torque for lifting such heavy objects and is also remotely controlled. A braking mechanism is provided as a safety feature to prevent an object from falling in the event the winch drive mechanism fails.

These and various other advantages and features of novelty which characterize the invention or point out with particularity in the claims annexed hereto and form a part hereof. However, for a better understanding of the invention, its advantages, and the objects obtained by its use, reference should be made to the drawings which form a further part hereof, and to accompany descriptive matter, in which there is illustrated and described specific examples of an apparatus in accordance with the invention.

BRIEF DESCRIPTION OF THE DRAWINGS

Referring now to the drawings in which like reference numbers represent corresponding parts throughout:

FIG. 4a is a perspective view of the brake sprocket, sleeve and shaft of the present invention;

FIG. 4b is a perspective view of the knob having the protruding slot to engage the recessed slots of the sleeve and shaft of FIG. 4a;

FIG. 5a is a side view of the gear for the brake of the invention;

FIG. 5b is a cross-sectional view taken along line A—A of FIG. 5a; and

FIG. 5c is a perspective view of the brake shoe mechanism for the brake of the invention.

DETAILED DESCRIPTION OF THE INVENTION

In the description of the preferred embodiment, reference is made to the accompanying drawings which form a part hereof and in which is shown by way of illustration specific embodiment in which the invention may be practiced. It should be understood that other embodiments may be utilized as structural changes may be made without departing from the scope of the present invention. The present invention provides a remotely controlled extendable boom mechanism for loading and unloading heavy objects through the side door of a van.

Figure 1:
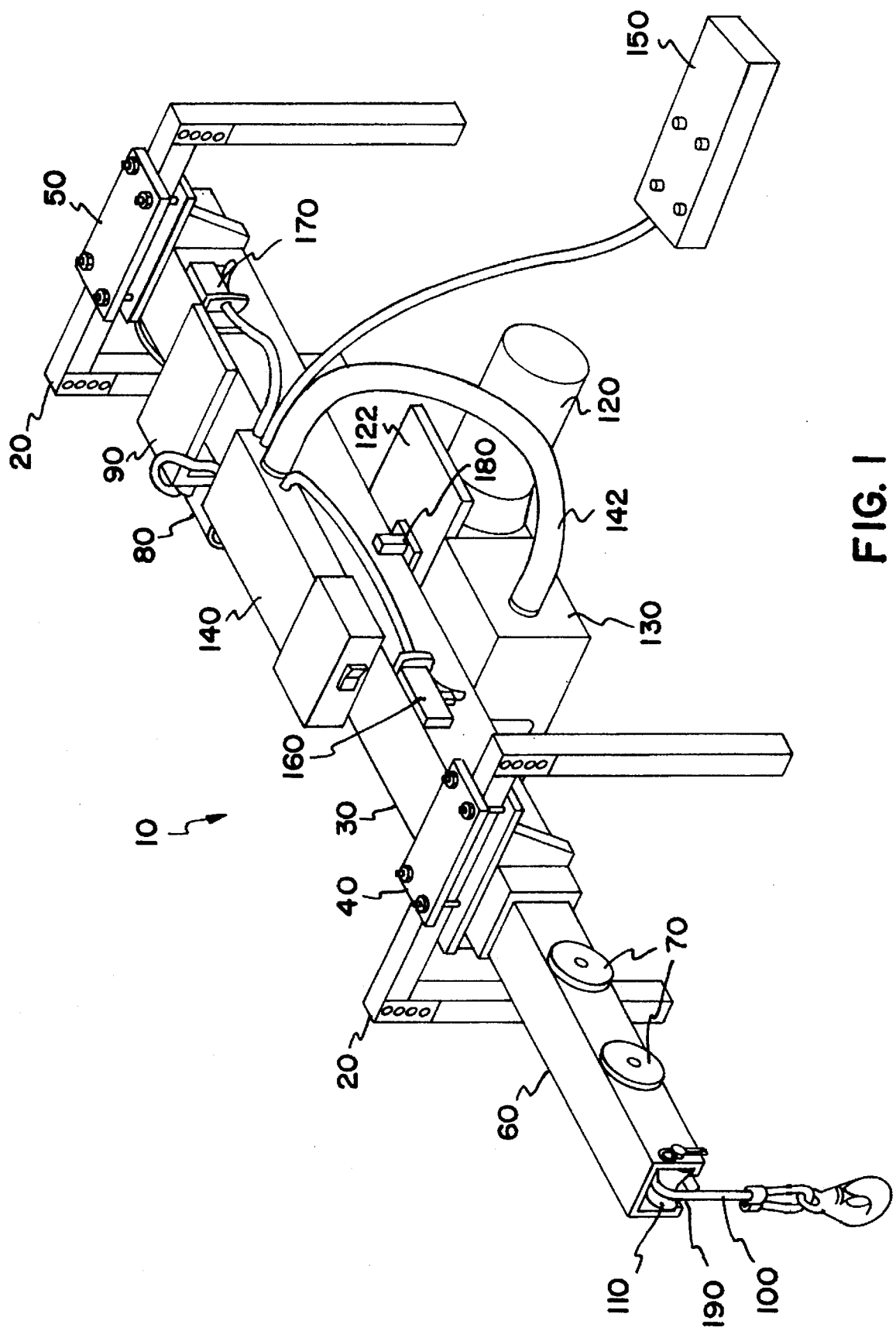
FIG. 1 shows a perspective view of the apparatus of the present invention.

FIG. 1 illustrates an exemplary system 10 in accordance with the present invention. Support members 20 support generally C-shaped boom receiving tube 30. The open end of the boom receiving tube 30, which is located adjacent the van door (not shown), is supported on support member 20 by bracket 40. The rear end of boom support tube 30 is supported by bracket 50. Extendable boom 60 slides in the boom support tube 30. Wheels 70 are attached to the side of the extendable boom 60 to facilitate movement of the extendable boom 60 within boom support tube 30. The extension of boom 60 is controlled by motor 80 (partially obscured) which is attached to bracket 90 at the rear portion of support tube 30.

Cable 100 extends throughout the length of the extendable boom 60 and is draped over the roller 110 at the anterior end of extension boom 60. Motor 120 drives a winch (not shown) which is attached under bracket 122. In the preferred embodiment, motor 120 is a gear motor, Model 1L474, manufactured by Dayton Electric Manufacturing Company of Chicago, Ill. However, any type of motor capable of providing sufficient torque could be used without departing from the invention.

The extendable boom 60 is also coupled to bracket 122. The electronics for controlling the extension of boom 60 and lowering of cable 100 is contained in control unit 130. The power to the system is provided by junction box 140. Cable 142 which is connected to control unit 130 and junction box 140 provides power and communication lines from junction box 140 to the control unit 130. All functions of the system are controlled by remote control 150. Switches 160, 170 control the range of motion for the extendable boom 60. Trigger 180 which is mounted to bracket 122 trips switch 160 when the boom 60 reaches the point of maximum extension and opens a circuit which turns off motor 80. When the boom 60 is being retracted within boom support tube 30, switch 170 is tripped by trigger 180 to again turn off motor 80. The tube 30 has an axial slot 190 extending along the bottom of the tube 30.

Figure 2:
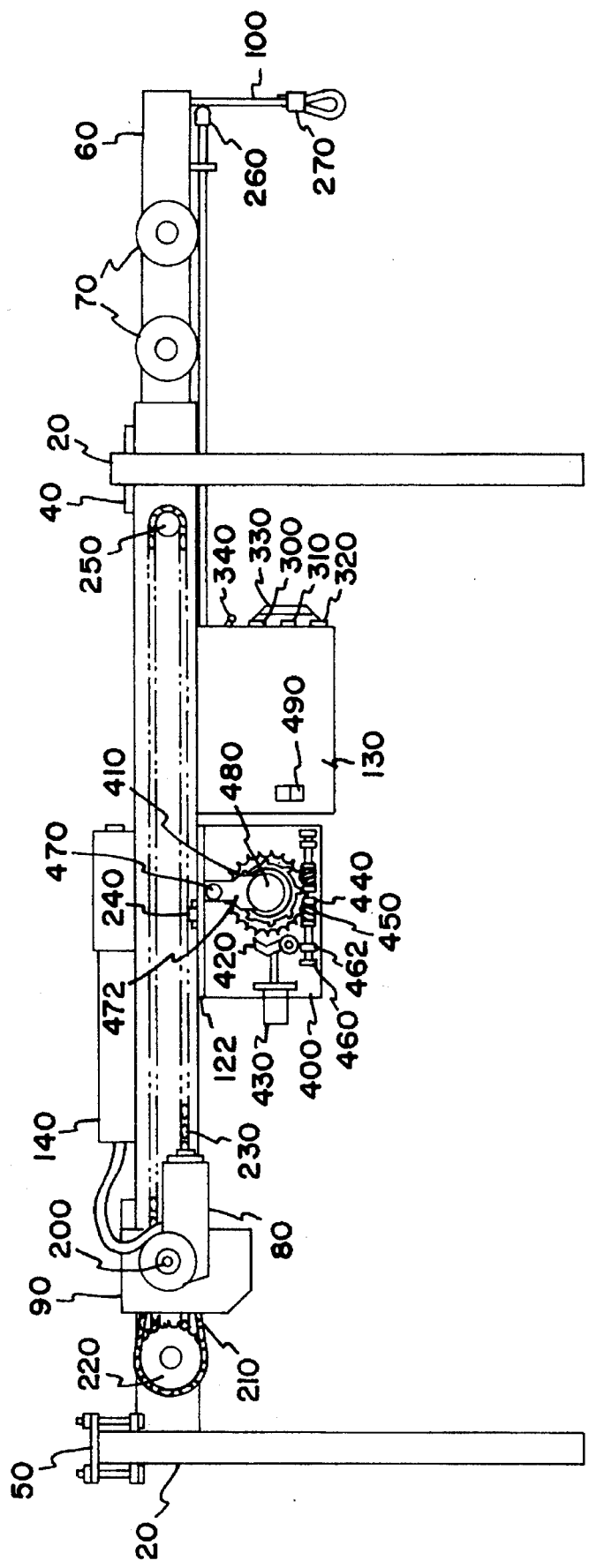
FIG. 2 is a side view of the loading and unloading apparatus of the present invention.

FIG. 2 shows a side view of the system. Support members 20 are shown holding boom support tube 30 at the anterior end by bracket 40 and at the posterior end by bracket 50. The extendable boom 60 is shown partially extended. Wheels 70 are shown attached to the extendable boom 60. Even in the fully extended position, a substantial portion of boom 60 remains within boom support tube 30.

Motor 80 for controlling the extension of boom 60 is shown attached to bracket 90. Cable 100 is shown extending out of the anterior end of extendable boom 60. Motor 80 drives a sprocket (not shown) which is located on the underside of bracket 90 on shaft 200. The sprocket drives chain 210 which in turn drives sprocket 220. Sprocket 220 is coupled to a smaller sprocket (not shown) to drive chain 230. Control unit 130 is attached by coupler 240 to chain 230. Thus as chain 230 travels around sprocket 250 control unit 130 is moved along support tube 30. Since bracket 122 is coupled to the control unit 130 and extension boom 60, chain 230 drives the extension boom 60, control unit 130, and bracket 122 through the full range of motion.

Cable 100 extends out the end of the boom for attaching to the object to be raised. A rod 260 extends out from control unit 130. One end of the rod 260 which is disposed internally to the control unit 130 activates a switch for disengaging the winding of the winch. As the object is being raised, the band 270 around cable 100 contacts rod 260 and trips the switch which is internal to control unit 130 thereby terminating power to motor 120.

Control unit 130 has indicator lights 300, 310, 320 to indicate whether the boom is being extended or whether the extension of the boom has been terminated. Light 330 attached to control unit 130 provides illumination to the operator outside the van which will be connecting cable 100 to an object to be lifted into the van. Circuit breaker 340 controls power to the control unit 130.

The winch includes a safety brake 400 for preventing the accidental dropping of an object while being lifted. Further, although motor 120 is selected to have a high torque, motor 120 does not resist being turned to effect unwinding of the cable from the winch when the motor 120 is not activated to lift an object. Thus, according to the preferred embodiment, it is necessary to provide a mechanism for resisting rotation of the winch when the object is not being lifted.

For this purpose, sprocket 410 rotates clockwise when an object is being lowered and latch mechanism 420 is moved away from gear 410 by solenoid 430. Movement of gear 410 is controlled by brake mechanism 440 (shown in greater detail in FIG. 5c). Spring mechanism 450 is compressed by bolt 460 which is held by bracket 462. This creates a force against brake 440 which opposes the motion of gear 410. Bolt 470 holds bracket 472 in place which in turn holds knob 480 in operable arrangement with the drive shaft of motor 120 (not shown). The operation of knob 480 will be explained in greater detail in the discussion associated with FIGS. 4a and 4b. Switch 490 on control unit 130 activates solenoid 430 pulling latch 420 away from gear 410, so that when knob 480 is uncoupled from the drive shaft of motor 120 cable 100 can be unwound from the winch by hand.

Figure 3:
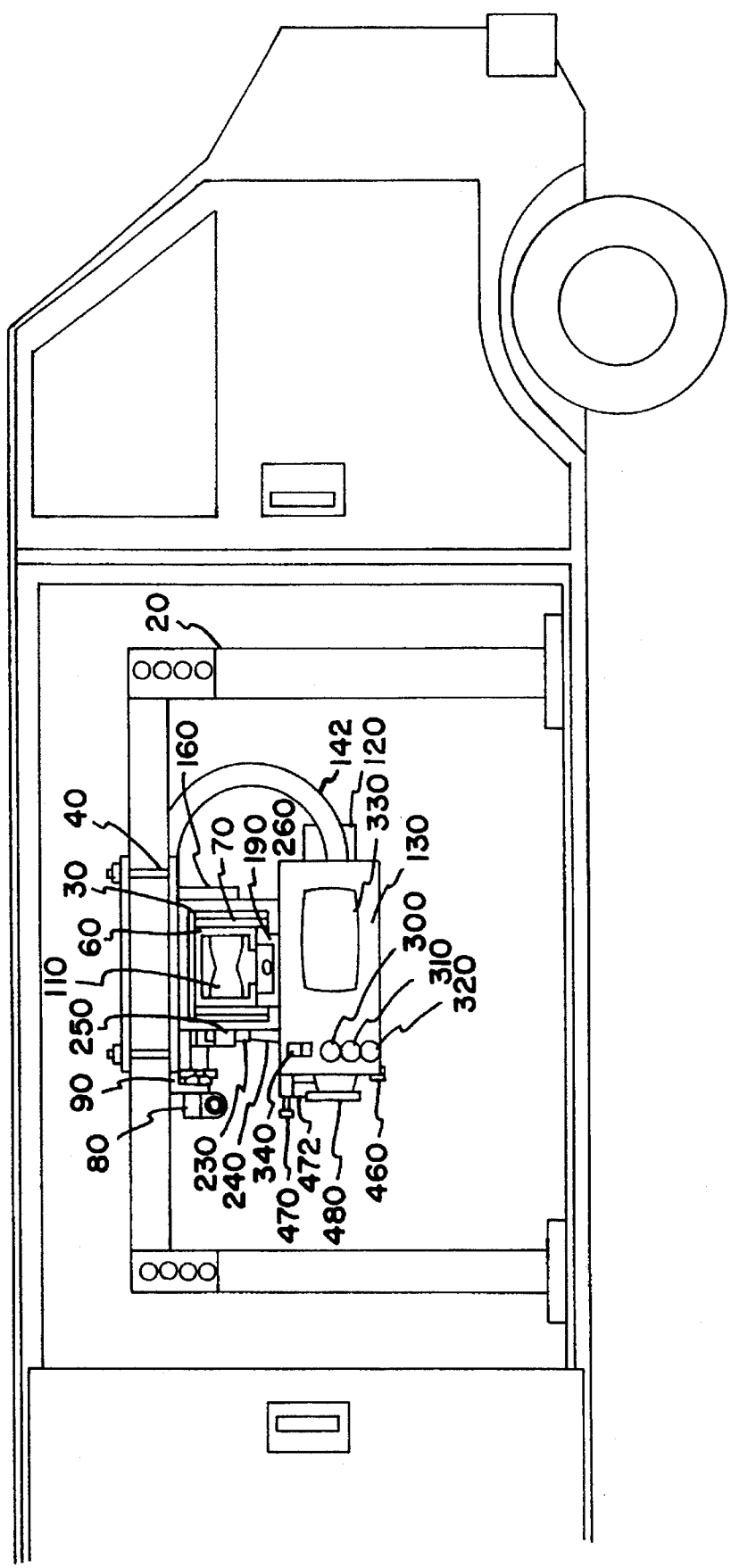
FIG. 3 is a front view of the present invention.

FIG. 3 illustrates a frontal view of the system as used in a van having a sliding side door. Support members 20 are shown holding support tube 30 using bracket 40. Extension boom 60 shown within support tube 30 and wheels 70 are shown riding along the cusp of support boom 30. The height of the support members 20 is chosen to allow the object being lifted to be pulled into the interior of the van by the retraction of the boom 60 and thereafter lowered to the floor of the van.

Boom drive motor 80 is shown attached to the side of bracket 90. Control unit 130 is attached to chain 230 by coupler 240. The end of rod 260 for automatically shutting off winch motor 120 is positioned below boom 60 (cable 100 is not shown). Indicator lights 300, 310, 320 are shown on the front face of control unit 130. Circuit breaker 340 is located above the indicator light. Light 330 is generally disposed in the center of the front face of control unit 130. A portion of the braking mechanism 400 is shown extending behind control unit 130. Bolt 460 for compressing the spring and forcing the brake mechanism against the gear is disposed at the lower left portion of control unit 130. Bolt 470 for securing bracket 472 to hold knob 480 is disposed above control unit 130.

FIG. 4a illustrates the sprocket 500 which gear 410 is mounted to. Drive shaft 510 of motor 120 is shown disposed within sprocket 500. The anterior end of motor drive shaft 510 has a notch 520 cut out at 90° intervals. Sleeve 530 slips over the drive shaft 510. Sleeve 530 also has notches cut in its anterior end at 90° intervals in order to match up with the notches of drive shaft 510. Sprocket 520 may be tightened with screws through holes 550 to secure sprocket 500 to sleeve 530. FIG. 4b shows knob 480 which may then be attached to the end of the arrangement shown in FIG. 4a. Knob 480 has a protrusion 540 which may engage notch 520 thereby causing the entire arrangement to rotate when drive shaft 510 rotates. The removal of knob 480 allows the drive shaft 510 to rotate independently of sleeve 530 and sprocket 500.

Referring again to FIG. 4a, sprocket 500 also has rectangular notches 560 cut out of shaft 570 parallel to the axis of shaft 570. Spring mechanisms are inserted into the slot 560 whereupon an engaging protrusion may be inserted over the spring within the slot 560. The spring causes the protrusion to extend beyond the surface of shaft 570 to engage gear sprocket 410. However, when a force is applied to the protrusion it becomes recessed within the notch 560 below or even with the surface of shaft 570.

FIG. 5a illustrates the braking gear mechanism and brake pad of the system. FIG. 5a is a side view of gear sprocket 410. The gear has an opening 600 which allows it to slip over sprocket 500. Notches 610 are cut into the inner wall 600 of gear 410. The movable protrusion 580 (shown in FIG. 4a) engages these notches 610. As illustrated, the gear rotates clockwise when the cable is being lowered. Accordingly the protrusion 580 extends into the notches and contacts surface 620 which is perpendicular to the inner wall 600. Thus, as coupler 500 rotates clockwise, the protrusion pushes against this perpendicular wall to cause gear mechanisms to rotate clockwise. During this motion, solenoid 430 is activated and pulls latch 420 away from the teeth of the gear 410 (shown in FIG. 2). When coupler 500 rotates counterclockwise, for winding the winch, the protrusions encounters the sloped wall 630. The sloped wall 630 causes the protrusion to be pushed downward into recess 560 (as shown in FIG. 4a).

FIG. 5b is a cut-away view of gear 410 along line A. The teeth 650 of gear 410 extend outward on the inner and outer portions of the gear cylinder. A recess 660 extends circumferentially around the gear between the inner and outer teeth protrusions.

A brake mechanism 440 is illustrated in FIG. 5c (only the left brake shoe is illustrated). The brake mechanism 440 consists of a curved metal plate 700 having a brake pad 710 on the inner surface. The curvature of plate 700 corresponds to the circumference of recess 600 in gear 410. The width of the brake 440 is also selected to match the recess 660 of gear 410. The upper edge 720 of plate 700 is inserted into a holding fixture (obscured in FIG. 2 by gear 410 and bracket 472). Plate 700 then wraps around gear 410 so that brake pad 710 engages recess 660. Now referring to FIG. 2 again, bolt 460 is threaded through bracket 462 to compress spring 450 against the bottom prong 730 of plate 700. The threaded portion of bolt 460 then passes through the opening 740 so that the bolt may be tightened thereby compressing spring 450. Thus, when the drive shaft 510 rotates counterclockwise, to wind the cable on the winch, the brake mechanism 440 holds gear 410 in place. Latch mechanism 420 engages the teeth 650 of gear 410 to prevent the object being lifted from falling in the event that motor 120 fails.

The foregoing description in the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. An extendable lifting apparatus for a vehicle having a frame with a longitudinal axis, a floor, and a body with a door opening along one side, comprising:

support means, secured to and extending from the floor of the vehicle, the support means being disposed within and on opposite sides of the vehicle;

a boom, extendable out the door opening of the vehicle along an axis perpendicular to the axis of the vehicle frame and beyond the exterior of the vehicle, for supporting a cable for lifting heavy objects;

boom receiving means, secured to the support means perpendicular to the axis of the vehicle frame and coupled to the extendable boom, for receiving the extendable boom, the boom receiving means comprising a substantially rectangular tube, the tube having an axial slot extending along the bottom of the tube forming an axial opening, the boom telescoping from a retracted position to an extended position, wherein the boom is wholly received in the tube when the boom is in the retracted position, the slotted wall of the tube forming a floor opposite an inner ceiling;

wherein the boom further comprises a plurality of spaced apart wheels on opposite sides of the boom, the plurality of wheels engaging the floor and the ceiling of the tube to facilitate movement of the boom between the retracted and extended positions and to maintain the position of the boom parallel to the tube;

winch means, coupled to the extendable boom, for successively winding and unwinding the cable for alternately raising and lowering objects;

first drive means, coupled to the receiving means, for moving the boom from a retracted position wholly within the receiving means to an advanced position;

second drive means, coupled to the winch means, for controlling the winding and unwinding of the winch means; and remote control means, electrically coupled to the first and second drive means, for independently activating and arresting the first and second drive means.

2. The apparatus according to claim 1 further comprising first switch means, coupled to the boom and the first drive means, for arresting the first drive means when the cable is fully wound by the winch means.

3. The apparatus according to claim 1 further comprising trigger means coupled to the second drive means, second switch means, coupled to the boom receiving means, for automatically arresting the extension movement of the boom when the advanced position of the boom is reached, and third switch means, coupled to the boom receiving means, for automatically arresting the retraction of the boom into the boom receiving means when the boom reaches the retracted position.

4. The apparatus according to claim 1 further comprising braking means, coupled to the second drive means, for preventing the unwinding of the winch when the second drive means experiences failure.

5. The apparatus according to claim 4, wherein the second drive means comprises a motor, a shaft having a distal and proximal end, and a spool, the motor being coupled to the distal end of the shaft and the spool being coupled substantially centrally on the shaft, the proximal end of the shaft opposite the motor extending outward from the spool.

6. The apparatus according to claim 5, wherein the proximal end of the shaft is slotted, the slots spaced at 90° intervals around the circumference of the proximal end of the shaft.

7. The apparatus according to claim 6 wherein the braking means further comprises:

a sleeve having an inner diameter matching the outer diameter of the shaft, the sleeve having slots at 90° intervals to match and align with the slots in the shaft;

a sprocket, securable to the sleeve, the sprocket having a plurality of channels extending radially along the outer surface of the sprocket;

a gear having teeth spaced apart along the outer circumference thereof, the gear having a inner circumference substantially the same as the outer circumference of the sprocket, the gear further comprising an outer contact surface adjacent the outer teeth and a plurality of spaced apart notches along the inner circumference, the notches having a gradual compressing side and an engaging side;

movable projection means, disposed in the channels of the sprocket, for meshing with the notches in the gear to transmit a force against the engaging side thereof to turn the gear when the cable is being unwound from the winch;

spring means, disposed within the channels beneath the projection means, for urging the projections out from the channels to mesh with the notches of the gear;

a knob having a protruding notch, the notch corresponding to the slots in the shaft and sleeve so that when inserted therein synchronizes the movement of the sleeve with the shaft;

solenoid means, coupled to the second drive means;

latch means, coupled to the solenoid means, for arresting the rotation of the gear in response to control signals sent to the solenoid means from the second drive means; and at least one brake shoe, coupled to the gear contact surface, for arresting the movement of the gear when the cable is being wound by the winch, the arrestment of the gear causing the projection means to be forced down into the channels by the compressing side of notches in the gears allowing the sprocket to turn within the stationary gear.

8. An extendable lifting apparatus for a vehicle having a frame with a longitudinal axis, a floor, and a body with a door opening along one side, comprising:

support means, secured to and extending from the floor of the vehicle, the support means being disposed within and on opposite sides of the vehicle;

a boom, extendable out the door opening of the vehicle along an axis perpendicular to the axis of the vehicle frame and beyond the exterior of the vehicle, for supporting a cable for lifting heavy objects;

boom receiving means, secured to the support means perpendicular to the axis of the vehicle frame and coupled to the extendable boom, for receiving the extendable boom, the boom receiving means comprises a substantially rectangular tube, the tube having an axial slot extending along the bottom of the tube forming an axial opening, the boom telescoping from a retracted position to an extended position, wherein the boom is wholly received in the tube when the boom is in the fully retracted position, the slotted wall of the tube forming a floor opposite an inner ceiling;

wherein the boom further comprises a plurality of spaced apart wheels on opposite sides of the boom, the plurality of wheels engaging the floor and the ceiling of the tube to facilitate movement of the boom between the retracted and extended positions and to maintain the position of the boom parallel to the tube;

winch means, coupled to the extendable boom, for successively winding and unwinding the cable for alternately raising and lowering objects;

first drive means, coupled to the receiving means, for moving the boom from a retracted position wholly within the receiving means to an advanced position;

second drive means, coupled to the winch means, for controlling the winding and unwinding of the winch means;

remote control means, electrically coupled to the first and second drive means, for independently activating and arresting the first and second drive means; and braking means, coupled to the second drive means, for preventing the unwinding of the winch when the second drive means experiences failure.

9. The apparatus according to claim 8 further comprising first switch means, coupled to the boom and the first drive means, for arresting the first drive means when the cable is fully wound by the winch means.

10. The apparatus according to claim 8 further comprising trigger means coupled to the second drive means, second switch means, coupled to the boom receiving means, for automatically arresting the extension movement of the boom when the advanced position of the boom is reached, and third switch means, coupled to the boom receiving means, for automatically arresting the retraction of the boom into the boom receiving means when the boom reaches the retracted position.

11. The apparatus according to claim 8, wherein the second drive means comprises a motor, a shaft having a distal and proximal end, and a spool, the motor being coupled to the distal end of the shaft and the spool being coupled substantially centrally on the shaft, the proximal end of the shaft opposite the motor extending outward from the spool.

12. The apparatus according to claim 11, wherein the proximal end of the shaft is slotted, the slots spaced at 90° intervals around the circumference of the proximal end of the shaft.

13. The apparatus according to claim 12 wherein the braking means further comprises a sleeve having an inner diameter matching the outer diameter of the shaft, the sleeve having slots at 90° intervals to match and align with the slots in the shaft;

a sprocket, securable to the sleeve, the sprocket having a plurality of channels extending radially along the outer surface of the sprocket;

a gear having teeth spaced apart along the outer circumference thereof, the gear having a inner circumference substantially the same as the outer circumference of the sprocket, the gear further comprising an outer contact surface adjacent the outer teeth and a plurality of spaced apart notches along the inner circumference, the notches having a gradual compressing side and an engaging side;

moveable projection means, disposed in the channels of the sprocket, for meshing with the notches in the gear to transmit a force against the engaging side thereof to turn the gear when the cable is being unwound from the winch;

spring means, disposed within the channels beneath the projection means, for urging the projections out from the channels to mesh with the notches of the gear;

a knob having a protruding notch, the notch corresponding to the slots in the shaft and sleeve so that when inserted therein synchronizes the movement of the sleeve with the shaft;

solenoid means, coupled to the second drive means;

latch means, coupled to the solenoid means, for arresting the rotation of the gear in response to control signals sent to the solenoid means from the second drive means; and at least one brake shoe, coupled to the gear contact surface, for arresting the movement of the gear when the cable is being wound by the winch, the arrestment of the gear causing the projection means to be forced down into the channels by the compressing side of notches in the gears allowing the sprocket to turn within the stationary gear.

14. An extendable lifting apparatus for a vehicle having a frame with a longitudinal axis, a floor, and a body with a door opening along one side, comprising:

support means, secured to and extending from the floor of the vehicle, the support means being disposed within and on opposite sides of the vehicle;

a boom, extendable out the door opening of the vehicle along an axis perpendicular to the axis of the vehicle frame and beyond the exterior of the vehicle, for supporting a cable for lifting heavy objects;

boom receiving means, secured to the support means perpendicular to the axis of the vehicle frame and coupled to the extendable boom, for receiving the extendable boom;

winch means, coupled to the extendable boom, for successively winding and unwinding the cable for alternately raising and lowering objects;

first drive means, coupled to the receiving means, for moving the boom from a retracted position wholly within the receiving means to an advanced position;

second drive means, coupled to the winch means, for controlling the winding and unwinding of the winch means, wherein the second drive means comprises a motor, a shaft having a distal and proximal end, and a spool, the motor being coupled to the distal end of the shaft and the spool being coupled substantially centrally on the shaft, the proximal end of the shaft opposite the motor extending outward from the spool, wherein the proximal end of the shaft is slotted, the slots being spaced at 90° intervals around the circumference of the proximal end of the shaft;

remote control means, electrically coupled to the first and second drive means, for independently activating and arresting the first and second drive means; and braking means, coupled to the second drive means, for preventing the unwinding of the winch when the second drive means experiences failure, wherein the braking means further comprises:

a sleeve having an inner diameter matching the outer diameter of the shaft, the sleeve having slots at 90° intervals to match and align with the slots in the shaft;

a sprocket, securable to the sleeve, the sprocket having a plurality of channels extending radially along the outer surface of the sprocket;

a gear having teeth spaced apart along the outer circumference thereof, the gear having a inner circumference substantially the same as the outer circumference of the sprocket, the gear further comprising an outer contact surface adjacent the outer teeth and a plurality of spaced apart notches along the inner circumference, the notches having a gradual compressing side and an engaging side;

moveable projection means, disposed in the channels of the sprocket, for meshing with the notches in the gear to transmit a force against the engaging side thereof to turn the gear when the cable is being unwound from the winch;

spring means, disposed within the channels beneath the projection means, for urging the projection means out from the channels to mesh with the notches of the gear;

a knob having a protruding notch, the notch corresponding to the slots in the shaft and sleeve so that when inserted therein synchronizes the movement of the sleeve with the shaft;

solenoid means, coupled to the second drive means;

latch means, coupled to the solenoid means, for arresting the rotation of the gear in response to control signals sent to the solenoid means from the second drive means; and at least one brake shoe, coupled to the gear contact surface, for arresting the movement of the gear when the cable is being wound by the winch, the arrestment of the gear causing the projection means to be forced down into the channels by the compressing side of notches in the gears allowing the sprocket to turn within the stationary gear.

* * * * *